BEST AVAILABLE COPY

BEST AVAILABLE COPY

C. La DOW.
Horse Hay Rake.

No. 8,157. Reissued April 2, 1878.

WITNESSES

Franck L. Ouraud

John Schroeder

INVENTOR

Charles La Dow

Alexander Mason

ATTORNEYS

N. PETERS, PHOTO-LITHOGRAPHER, WASHINGTON, D. C.

UNITED STATES PATENT OFFICE.

CHARLES LA DOW, OF ALBANY, NEW YORK.

IMPROVEMENT IN HORSE HAY-RAKES.

Specification forming part of Letters Patent No. 168,648, dated October 11, 1875; Reissue No. 8,157, dated April 2, 1878; application filed May 17, 1877.

*To all whom it may concern:*

Be it known that I, CHAS. LA DOW, of the city of Albany, in the county of Albany and State of New York, have invented certain new and useful Improvements in Wheel Hay-Rakes; and do hereby declare that the following is a full, clear, and exact description thereof, reference being had to the accompanying drawings, and to the letters of reference marked thereon, which form a part of this specification.

This invention relates to that class of wheel horse-rakes known as "dumping" or "self-discharging" rakes; and consists of a friction device acted upon by both wheels for raising and lowering the teeth at the will of the operator, or for carrying them in a raised position; a foot-lever and connections for applying the friction to the revolving portion of the rake, and for acting as a stop or check to the friction when the teeth are raised high enough to discharge their load; an equalizing or compensating device, whereby an equal amount of pressure is applied to, and an equal amount of power obtained from, each wheel; a divided axle, each half being firmly fastened to its corresponding wheel, allowing the wheels to turn in opposite directions; a grooved or slotted head for supporting the teeth, locked to the axle by pressure upon the friction device when the wheels are advancing, but self-loosening when either wheel is retreating or remains stationary; a reversible button placed between and holding two teeth in place in the head, admitting of either tooth being readily taken out and replaced, and allowing independent motion to each tooth, but preventing sidewise vibration; and rubber stops to prevent the hay from riding on the teeth, together with a hand-lever attached to the frame of the rake, and connected to the head in such a manner that when pressure is applied to said lever it will hold the teeth down to their work, the handle also being available to lift the teeth when backing, and also serves to keep them in a raised position when desired.

In order to enable others skilled in the art to which my invention appertains to make and use the same, I will now proceed to describe its construction and operation, referring to the annexed drawing, in which—

Figure 1:
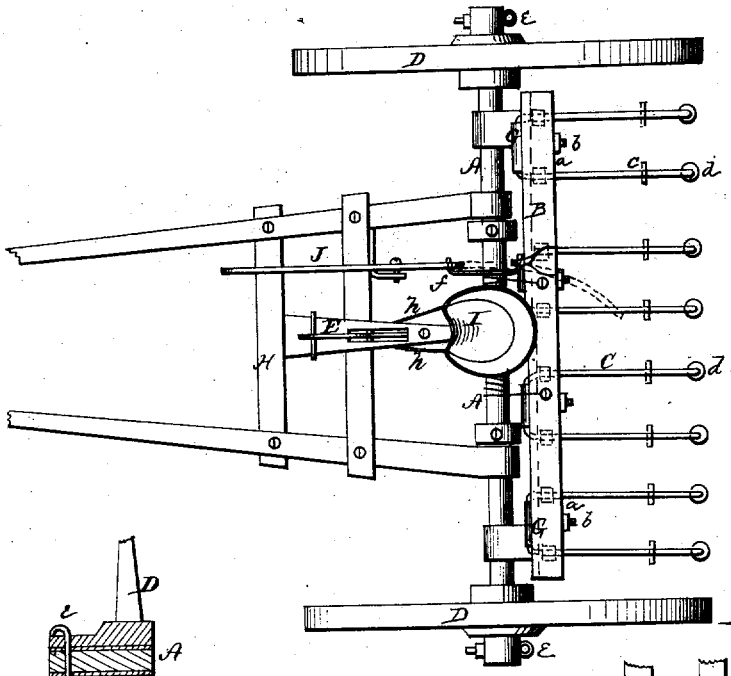
Figure 3:
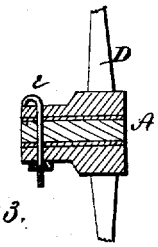
Figure 3:
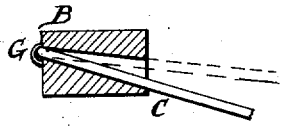
Figure 4:
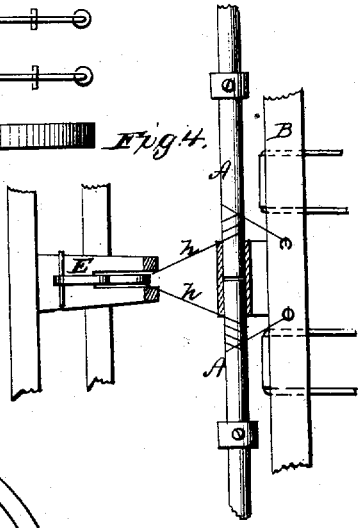
Figure 2:
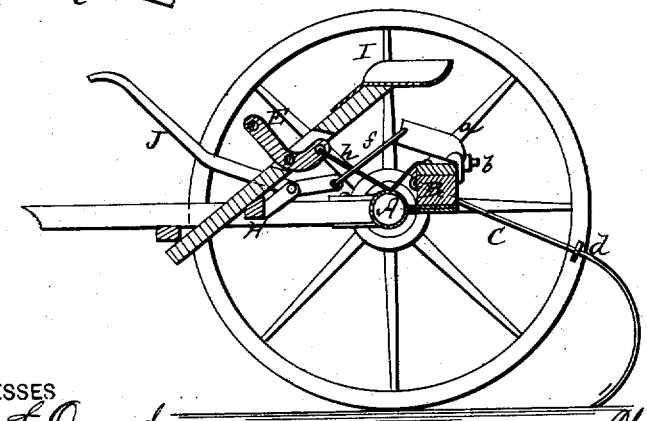

Figure 1 is a plan view of a horse hay-rake embodying my invention. Fig. 2 is a transverse vertical section of the same through the line *x x*, Fig. 1. Figs. 3 and 4 are detached views of parts thereof.

The frame and head B of the rake is boxed to and mounted in the usual manner upon the axle A A, which is divided in the center, each half A of said axle being firmly fastened to its corresponding wheel D by a linchpin, *e*. A piece of wire or cord, *h*, is wrapped a number of times around each half A of the axle. At or near the center of the head B the back end of each coil is secured firmly to the head, while the forward ends are connected to the foot-lever E, in such a manner as to equalize the amount of force exerted upon each band when pressure is applied by the lever. This equalizing may be done by uniting the cords or wires *h*, and passing them through a hole or equivalent device in the foot-lever E, as represented in the drawing.

When pressure is applied the lever will pull on the center of the cord or wire, and perfectly equalize the strain on the band; but it is obvious that this device may be subjected to many modifications which will accomplish the same result.

The advantages gained by wrapping the bands several times around the axle or axles are, first, by so doing a sufficient friction-surface is obtained directly upon the axle, without pulleys or equivalents, to enable the operator to discharge the load with ease; and, second, the spiral band, encircling a small diameter, winds up and tightens around the advancing axle, while the opposite band unwinds and loosens around the retreating axle, although a uniform pressure is applied at the same time to both bands through the equalizing device and foot-lever, thus permitting the wheels to turn in opposite directions without straining the parts or use of ratchets, while compelling either wheel when advancing to raise the teeth, and also to act more in concert when turning curves than can be done by any system of ratchets or gearing.

When the teeth are raised to a proper height the foot-lever is pushed down, and rests on the frame H of the rake, which acts as a check or stop to the friction, and prevents undue strain upon the parts or sliding the wheels, while the teeth can thus be carried in a raised position for any distance.

The teeth *c* are provided at their upper ends with right-angled bends, which are kept in place on the front side of the head B by a half-groove in the head, and by reversible buttons G, having half-grooves formed in them. These buttons are pivoted to the head, and confine two teeth each, in such a manner as to allow either tooth to have an independent motion in passing obstructions, but prevent sidewise wear, and also admit of any tooth being readily taken out by reversing the button and withdrawing the tooth forward through the slots in the head.

The teeth are also provided with stops *d*, of rubber or other elastic material, having holes formed in them, so as to slide on and fit the teeth, and which are readily adjusted and moved to any part of the tooth, preventing hay from collecting and riding on the teeth, or from twisting and roping out near the wheels.

A hand-lever, J, is attached to the frame, having a connection, *f*, extending rearward to the head. The teeth may be held down to their work by pressure upon said lever, lifted, or carried in a raised position, when desired, by placing the end of the lever J, which is suitably curved, under one of the teeth.

Having thus fully described my invention, what I claim as new, and desire to secure by Letters Patent, is—

1. In a horse hay-rake, the combination, with parts rotating permanently with each traveling wheel, of a controllable friction dumping device, acted upon by each wheel in its forward movement only, and a lever for causing said friction device to bite the rotating surface at will.

2. A friction-gripe applied spirally to the revolving portion of a wheel-rake, in combination with suitable mechanism to determine its stress upon said revolving portion, for the purpose of raising and lowering the teeth.

3. The combination of a revolving axle, a rake-head hung in rear thereof, a friction-gripe connected with the rake-head and passed around the circumference of the axle, and a lever for tightening said gripe around the axle.

4. The combination of a friction device and a divided axle having the wheels rigidly affixed thereto.

5. The reversible button, in combination with the rake teeth and head.

6. The rubber or equivalent stop to rake-teeth.

7. The longitudinally-grooved button G, pivoted to the front of the rake-head, in combination with the bent rake-teeth and grooves in the head, whereby the teeth are secured to the head and a free hinge movement of the same permitted, substantially as herein set forth.

8. The lever-handle curved to hook under one of the teeth, in combination with the friction-gripe, substantially as herein described, the axle carrying the wheels, the rake-head, and the rake-teeth, for the purposes herein set forth.

9. The combination of a friction-gripe with the axle and rake-head, for locking them together, for the purposes set forth.

In testimony that I claim the foregoing I have hereunto set my hand and seal this 1st day of May, 1877.

CHARLES LA DOW. [L. S.]

Witnesses:

THOS. B. MORROW,
FRANK KAMPFER.